March 28, 1967 W. B. GAUNT, JR 3,311,900

CURRENT PULSE DRIVER WITH REGULATED RISE TIME AND AMPLITUDE

Filed Jan. 14, 1963

INVENTOR
W. B. GAUNT, JR.
BY
Charles Scott Phelan
ATTORNEY

United States Patent Office 3,311,900
Patented Mar. 28, 1967

3,311,900
CURRENT PULSE DRIVER WITH REGULATED RISE TIME AND AMPLITUDE

Wilmer B. Gaunt, Jr., Lincroft, N.J., assignor to Bell Telephone Laboratories, Incorporated, New York, N.Y., a corporation of New York Filed Jan. 14, 1963, Ser. No. 251,433
4 Claims. (Cl. 340—174)

This invention relates to a current pulse driver; and, more particularly, the invention relates to a driver for supplying current pulses to variable impedance loads.

The invention will be described in its application to a magnetic memory system, but it is to be understood that this framework for description is merely a device of convenience in presenting the underlying principles of the invention and should not be taken in any way as a limitation upon the application of the invention.

A magnetic memory system employs current pulses in electric circuits linking bistable, magnetic, information-storage devices for generating magnetomotive forces to actuate such devices in accordance with memory functions as is well known in the art. It is necessary for consistently accurate memory operation that the current drive pulses should have a predetermined rise time configuration that is constant from one time to another. It is also necessary that this pulse rise time configuration should be relatively free from noises such as leading edge spikes and ringing. A number of current driver circuits have been devised for this purpose, but they all employ relatively complex structures and operating mechanisms in order to obtain an output pulse of a desired configuration and to maintain that configuration in spite of variations in driver loading that may take place from time to time.

It is, accordingly, one object of the present invention to stabilize the output pulse configuration of a current pulse driver by means that are both simple and inexpensive.

Another object is to reduce noise distortion in the output of current pulse generators.

A further object is to control readily the output pulse configuration of a current pulse generator, and to do so by means which effect this control substantially independently of the magnitude of any load which is imposed upon the generator.

These and other objects of the invention are realized in one illustrative embodiment in which a transistor pulse amplifier is arranged in the common emitter circuit configuration with a variable inductive load connected in the collector circuit thereof. A resistor-coil time constant circuit is connected in the emitter circuit of the transistor for controlling the rise time of transistor output pulses. A shunt regulating feedback circuit is also provided to maintain a substantially constant maximum potential difference across the time constant circuit.

It is one feature of the invention that the emitter circuit of a transistor current pulse driver is regulated to control current variations in the collector circuits of the driver.

Another feature is that impedance means in the emitter circuit of a transistor pulse amplifier are utilized to prevent transistor saturation so that the collector circuit current pulse configuration is independent of collector circuit load impedance.

A further feature is that a coil in a transistor emitter circuit is utilized to fix the rate of increase in base-emitter current of the transistor in response to an input pulse in the transistor base circuit.

An additional feature of the invention is that the time constant of impedances in a transistor emitter circuit is selected to fix the rate of transistor base-emitter current increase, in response to input pulses on the transistor base electrode, at a level such that the collector current rise time has an advantageous relationship to the switching time of a bistable magnetic switching device coupled to the collector circuit.

The various objects, features, and advantages of the present invention may be more clearly understood upon a consideration of the following description and the appended claims in connection with the attached drawing in which:

Figure 1:
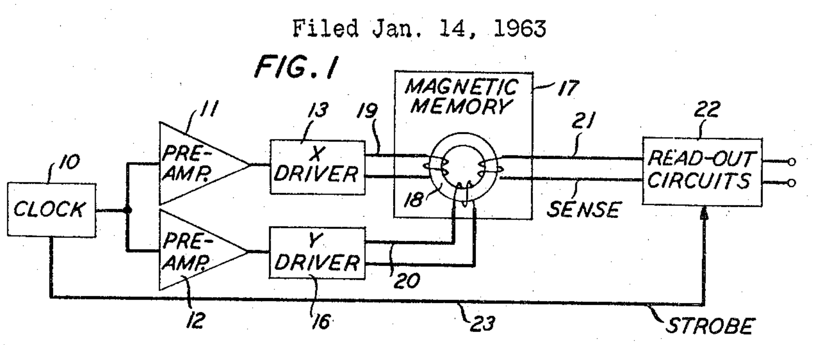
FIG. 1 is a block and line diagram of a simplified magnetic memory system utilizing the present invention.

In the magnetic memory system illustrated in FIG. 1, a source 10 of clock signals supplies pulses at appropriate intervals to the input connections of two preamplifier circuits 11 and 12. Those clock signals are coupled by the preamplifiers to input connections of two current pulse driver circuits 13 and 16. In accordance with the present invention, these drivers supply output pulses of a predetermined configuration through appropriate address translating circuits, not shown, to selected locations in a magnetic memory array 17. This array is advantageously a three-dimensional matrix of bistable magnetic storage devices which are switchable back and forth between their stable states by the application of magnetomotive forces thereto of appropriate polarity and magnitude. These devices may take a number of forms, such as toroidal cores, twistors, and apertured ferrite sheets. However, in each case, the hysteresis characteristic of each elemental device in the array is substantially rectangular and defines two stable states of remanent magnetic flux. The memory 17 may include many thousands of such devices, however, for purposes of the present invention it is adequate to represent all such devices schematically by the single toroidal magnetic core 18 within the array 17.

In accordance with the normal practice for selecting a device in the memory 17 for operation by the application of coincident currents along different coordinates of the memory array, a first coordinate drive circuit 19 couples the output of driver 13 to the core 18; and a second coordinate driver circuit 20 couples the output of driver 16 to the core 18. The coincident application of pulses of half-select magnitude to the circuits 19 and 20 causes a magnetomotive force to be generated in the core 18 with sufficient magnitude to switch the flux in that core from one remanent flux polarity state to a remanent flux condition of the opposite polarity.

A sensing circuit 21 is electromagnetically coupled to the core 18 and supplies voltage signals induced in the circuit 21 to read-out circuit 22. The latter circuit advantageously includes a sensing amplifier and a pulse amplitude discriminator for indicating, in systems using binary coded information storage, whether the signal induced in circuit 21 represented a binary ONE or a binary ZERO. In order to fulfill its operation, the read-out circuit 22 is strobed by a pulse on a lead 23 from clock source 10 at an interval when it is anticipated that a binary ONE would have maximum amplitude while a binary ZERO would have a decreasing amplitude. In accordance with the present invention the output pulses from drivers 13 and 16 are essentially noise free, they have uniform pulse rise time, and they have predetermined uniform maximum pulse amplitudes. Accordingly, the switching operations taking place within magnetic memory 17 are predictable, and the time with respect to the clock pulse supplied by lead 23 at which the device in memory 17 actually switches is always known. Consequently, the optimum sampling time is always utilized to obtain a maximum value for signal-to-noise ratio in the read-out circuits in a manner which is now known in the art.

Before discussing details of current drivers in accordance with the present invention, it is helpful to outline the relationship between memory system operations and drive pulse noise and configuration variations. It is known in the art that bistable magnetic storage devices, of the types previously mentioned herein and schematically represented by core 18, require a predetermined minimum finite time in order to accomplish a switching operation from one stable state to the other. During that time such a device presents a large inductance to the drive circuit, but thereafter the coupling circuit resistance is the principal impedance presented to the driver. However, if the magnetomotive force applied to the device in order to accomplish such switching has a step function rise time, the device 18 reacts thereto only so fast as its maximum rate of switching will permit. The result of this action is that the drive current in a drive circuit 19, for example, has a large spike at the leading edge thereof, and this prespike is followed by damped ringing in the fashion illustrated in the solid-line diagram of FIG. 4. The ringing results from the circuit inductances and various spurious capacitances such as the base-collector and collector-ground capacitances of transistor 51 schematically indicated by the capacitors 24 and 25 in FIG. 2. Such a diagram results in response to a control pulse of the type illustrated in FIG. 3 applied from preamplifier 11 to a driver with no output rise time control but having amplitude regulation such as might be obtained from an input circuit voltage limiter.

Figure 4:
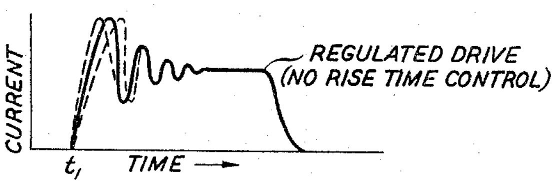
FIGS. 4 and 5 are current-versus-time diagrams illustrating the operation of the invention.

It has been found in some cases that the prespike illustrated in FIG. 4 is of sufficient amplitude to be at least equal to the full select amplitude required to generate coercive magnetomotive force within a bistable magnetic device which is linked by a circuit carrying such a prespike. Consequently, this drive current spike is capable of switching, or at least initiating a switching operation in, a device which is linked by such circuit. Such switching takes place in half-selected devices even though there is no other magnetomotive force applied to such device at the time of the prespike. Furthermore, the decaying oscillations induce signals into the sensing lead during the read-out interval. These signals bear no relation to the stored information, and as a result the integrity of the memory output is reduced. Accordingly, the result of the prespike and the following ringing, both of which constitute noise, is that they tend to produce highly erratic operation in the memory.

In addition to the aforementioned system difficulties produced by drive pulse noise, there are others caused by other drive pulse shape variations. Each of the coordinate drive circuits 19 and 20 in FIG. 1 links a large number of nonselected bistable magnetic devices in addition to the single device which is selected by the intersection of those two circuits in the matrix array. These additional nonselected devices may reside in a variety of permutations of their bistable conditions, depending upon the particular type of information which is stored in each such device. It is well known that the hysteresis characteristic of bistable magnetic devices is not perfectly rectangular and that each device rests in a stable state of remanent magnetic flux wherein the flux density is somewhat smaller than the flux density for the saturated flux condition of the device in that particular stable condition. The result is that any signal coupled to a device generates a magnetomotive force in the device and produces some measure of flux change, either large or small, even though the magnetomotive force is insufficient to switch the device from one stable state to another.

The flux changes, both large and small, all induce voltages in sensing circuit 21 to produce noise; but more importantly in connection with the present invention, each such flux switch comprises a small additional segment of loading on the drive circuit. The magnitude of the loading is not at all certain from one time to the next because the flux density condition prevailing in each device depends upon the immediate past history of magnetomotive forces which have been applied to that particular device. Accordingly, the loading in the driving circuit changes along with the memory information content and the half-select drive history of each device linked by a drive circuit. Such loading variations in many prior art drivers influence the drive pulse rise time as indicated by dotted wave portions in FIG. 4. However, if the rise time changes, then the exact time at which the selected device begins to switch also changes; and the optimum time for sampling the resulting signals in read-out circuits 22 also changes. The clock source 10 is unaware of such change and produces the strobe pulse on circuit 23 at the same time for each bit interval regardless of changes in the loading of the output circuit of the drivers 13 and 16. Thus, the changes in loading on the drivers change the drive pulse rise time and produce a shift in the occurrence time of the optimum sampling interval for the resulting pulse in a sensing circuit. Consequently, the signal-to-noise ratio for that pulse is somewhat reduced and the possibility for error in discriminating between ONES and ZEROS is increased.

Figure 2:
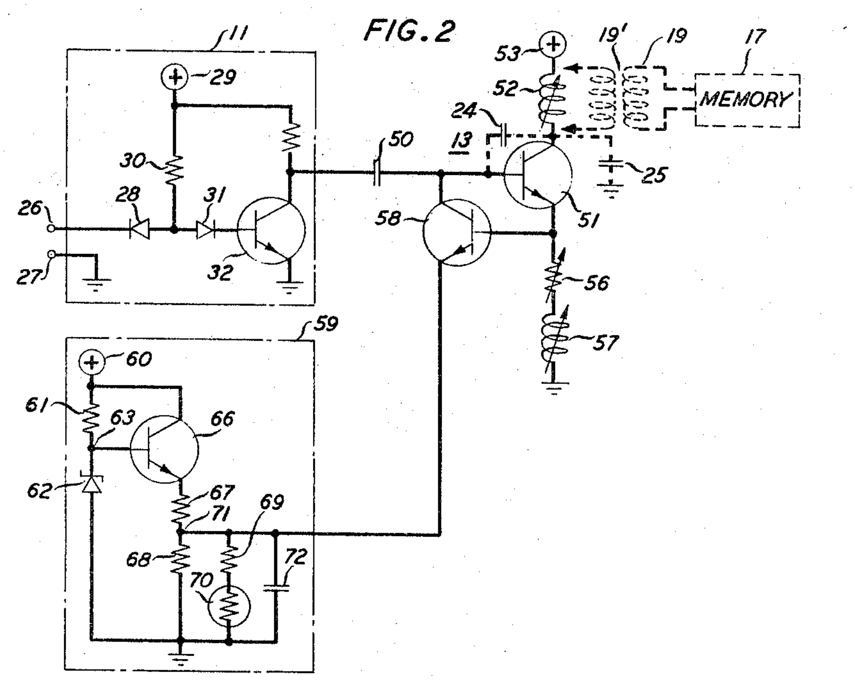
FIG. 2 is a schematic circuit diagram of a current pulse driver of the type used in the system of FIG. 1 in accordance with the present invention.

A current pulse driver circuit in accordance with the present invention is illustrated in FIG. 2 and is of a type which operates to eliminate the sort of drive pulse illustrated in FIG. 4 with its numerous variables. The circuit of FIG. 2 produces a drive pulse of the type illustrated in FIG. 5 which is stable, noise-free, and repeatable in all respects, regardless of the variations in drive circuit loading heretofore mentioned. Only the driver 13 is illustrated, but the driver 16 is identical in configuration and operation.

In FIG. 2, the preamplifier 11 has a pair of input terminals 26, 27 for receiving negative-going clock pulses which bias a diode 28 into conduction. Current flow from a positive source 29 through a resistor 30 and the diode 28 clamps the anode of another diode 31 at about ground potential. Source 29 is schematically represented by a circled plus sign to indicate that the source positive terminal is connected to resistor 30 and the negative terminal is grounded. Other potential sources in FIG. 2 are shown in a similar convention. The clamping action at that anode biases diode 31 nonconducting and deprives a transistor 32 of base current and that transistor is thereby also biased nonconducting. The resulting positive-going pulse at the collector electrode of transistor 32 is coupled by a capacitor 50 to the base electrode of a transistor 51 in the driver 13. Transistor 51 is connected in a common emitter configuration and is the active gain-producing element in the driver. The collector electrode of transistor 51 is connected through a variable inductance coil 52 to a source 53 of positive potential. Source 53 has a terminal voltage that is larger than the peak potential with respect to ground of control pulses applied to the base electrode of transistor 51. Coil 52 represents the schematic circuit equivalent of a transformer 19' for coupling the driver output signal to circuit 19 and to the magnetic memory 17 as indicated by the dotted circuit components adjacent to the coil 52. This coil is indicated to be variable to represent schematically the variable inductive loading presented by the memory 17 in the manner which has just been described. The maximum inductance of coil 52 is determinable and would be the inductance corresponding to the worst possible combination, from an inductive loading standpoint, of information bits that could be stored in bistable devices linked by drive circuit 19 in the memory 17.

Figure 3:
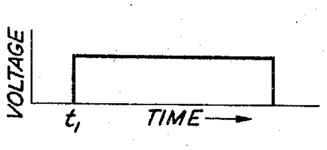
FIG. 3 is a control voltage-versus-time diagram utilized in describing the invention.

In the common emitter circuit which has been described thus far, it has been found that the application of a control pulse of the type illustrated in FIG. 3 from preamplifier 11 initiates the flow of base-emitter current in transistor 51. The presence of the large inductive loading in the collector circuit of transistor 51 impedes the increase of current in the collector circuit in the manner which is well known in the art. Consequently, substantially all of the voltage of source 53 is developed as a potential difference across the coil 52, and the voltage with respect to ground at the collector electrode of transistor 51 is usually significantly lower than the voltage with respect to ground at the base electrode of the transistor. Consequently, transistor 51 enters initially into saturated conduction, and in that condition the inductance of coil 52 controls the initial magnitude of collector electrode current. The inductance of coil 52 also controls the slope of the collector current rise during the initial interval of drive current. Thus, all of the aforementioned drive pulse variables prevail, namely, the variable drive pulse rise time, the prespike, and the ringing.

In accordance with the present invention, there is connected in the emitter circuit of transistor 51 a resistor 56. A coil 57 is connected in series with resistor 56 between the emitter electrode of transistor 51 and ground. Coil 57 and resistor 56, both of which are adjustable, are selected with impedance magnitudes proportioned so that the time constant of the emitter circuit of transistor 51 restricts the rate of change of current through the base-emitter junction of the transistor so that the rate of change of current in the collector electrode of the transistor is thereby also affected. It has been found that in some practical applications resistor 56 is advantageously a wire wound resistor, and as such it has sufficient inductance to provide the correct impedance proportions without adding the separate inductance 57. The schematic representation of resistor 56 and coil 57 includes this combination. The restriction on the rate of change in collector current, together with the known maximum inductance of coil 52 fixes the maximum potential difference that can be developed across that coil.

The time constant of resistor 56 and coil 57 is selected so that the rate of change of current in the collector electrode of transistor 51 can never develop across coil 52 a potential difference which is larger than the voltage difference between the output potential of source 53 with respect to ground, and the peak potential with respect to ground anticipated at the base electrode of transistor 51 in response to control pulses of the type illustrated in FIG. 3. In other words, this time constant is selected to have a value which so impedes the rate of increase of base-emitter current of transistor 51 that the base of the illustrated NPN transistor 51 can never be biased more positively than the collector thereof. Accordingly, the transistor is incapable of being driven into its saturated conduction condition.

It is known, of course, that if a transistor operates in its normal active region, and not in its saturated conducting region, the transistor collector current is essentially independent of the collector voltage and depends primarily upon the magnitude of the base-emitter current in the transistor. Consequently, in the circuit of FIG. 2, the collector current is controlled by impedance elements in the emitter circuit which are isolated from the variable loading of magnetic memory 17 and which can, therefore, fix the rise time of the collector current pulse in a controlled manner to produce optimum results. The first one of these results is the one already mentioned, namely, preventing transistor 51 from entering its saturation region.

In terms of circuit parameters, it appears that by keeping transistor 51 out of saturation the collector-emitter resistance thereof, which is in series with coil 52, is kept so high that the critical impedance ratio for circuit oscillation is never attained. Consequently the prespike and ringing of FIG. 4 do not occur.

Figure 5:
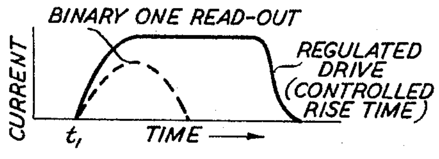

A further advantage of the arrangement of the resistor-coil time constant circuit in the emitter connections of transistor 51 is that the output current pulse rise time for the driver 13 can be further fixed so that high frequency energy generated during excessively fast rise times is not produced and is not coupled to the magnetic storage devices of the magnetic memory 17. Such energy represents noise in the memory sensing circuits. Normally this time constant is advantageously set to fix drive pulse rise time so that the output current pulse attains approximately ninety percent of its maximum amplitude slightly before the anticipated peaking time of a binary ONE sensing circuit signal in the memory output. This time relationship is indicated in FIG. 5 by the dotted curve, representing a binary ONE read-out signal, which is superimposed on the drive current curve. The illustrated relationship permits some rise time variations to occur without affecting the peak output signal from the memory. Accordingly, an advantageous rise time interval is set and the noise effects represented by the prespike and ringing portion of the wave illustrated in FIG. 4 are eliminated.

A second transistor 58 is provided in the driver 13 in FIG. 2 and has its collector-emitter circuit connected between the base electrode of transistor 51 and a source 59 of temperature compensated reference potential. The output voltage of reference source 59 is selected to have a magnitude such that this magnitude plus the potential difference between base and emitter electrodes of transistor 58 is equal to the desired potential difference to be developed across resistor 56 and coil 57 by the steady state emitter current in transistor 51 when the desired level of steady state collector current for that same transistor is flowing. The emitter potential of transistor 51 at that level is thus adequate to maintain conduction in transistor 58. If the emitter potential for transistor 51 should for any reason begin to increase or decrease, a corresponding change in the bias for transistor 58 takes place and a corresponding change in the collector-emitter current of transistor 58 takes place to alter the amount of current shunted away from the base electrode of transistor 51 by the transistor 58.

This shunt regulating feedback connection, including transistor 58, gives the current driver circuit the input characteristic of a variable impedance, constant voltage network so that any changes taking place in the output characteristics of preamplifier 11 merely cause a different amount of current to be shunted from the base electrode of transistor 51 through the transistor 58 to maintain the desired potential with respect to ground at the emitter electrode of transistor 51. It has been found in practical circumstances that the previously described combination of a resistor-coil time constant circuit and the shunt regulating feedback circuit produces the drive current pulse configuration illustrated in FIG. 5 for current at the collector electrode of transistor 51. This FIG. 5 configuration is repeatable regardless of the changes in inductance of coil 52, and the peak magnitude of that current pulse can be maintained over a prolonged train of pulses within a range of approximately plus or minus three percent.

Reference source 59 includes a positive potential source 60 which has connected between its terminals a resistor 61 and a reverse breakdown diode 62. Diode 62 is the type sometimes called a Zener diode which conducts variable amounts of current in the reverse direction with no substantial corresponding change in potential difference thereacross. A circuit terminal 63 between resistor 61 and diode 62 is connected to the base electrode of a transistor 66 thereby fixing the potential difference across the base-emitter junction of transistor 66 and the emitter circuit resistors 67 and 68.

A resistor 69 and a thermistor 70 are connected in series across resistor 68 to provide temperature compensation for the potential developed at another circuit terminal 71 between resistors 67 and 68. A bypass capacitor 72 also shunts resistor 68.

Terminal 71 is connected to the emitter electrode of transistor 58 so that the reference potential for the transistor is that developed across resistor 68. The direct-current base-emitter current loop for transistor 51 includes resistor 56, coil 57, ground, the parallel combination of resistor 68 with resistor 69 and thermistor 70, and the emitter-collector path within transistor 58. The resistances of that loop are all taken into account when determining the division of driver input current between the base electrode of transistor 51 and the collector electrode of transistor 58. However, it has been found that the time constant of resistor 56 and coil 57 is the principal factor controlling the share of input current going to the base electrode of transistor 51.

Although the present invention has been described in connection with a particular embodiment thereof, it is to be understood that additional embodiments and additional modifications thereof which will be obvious to those skilled in the art are included within the spirit and scope of the present invention.

What is claimed is:

1. In a current driver for a magnetic memory system,
a first transistor having base, emitter, and collector electrodes,
means applying control pulses to said base electrode for biasing said transistor into conduction,
a source of operating potential,
a drive circuit for said memory system connecting one terminal of said potential source to said collector electrode,
a resistor and a coil connected in series between said emitter electrode and another terminal of said source, said resistor and coil having together a time constant which is adapted to prevent saturated conduction in said transistor,
a source of reference potential,
a second transistor having base, emitter, and collector electrodes, the collector and emitter electrodes of said second transistor being connected between the base electrode of said first transistor and said reference potential source, and
a feedback connection from the emitter electrode of said first transistor to the base electrode of said second transistor.

2. In a current pulse driver,
a source of control pulses,
a transistor having base, emitter, and collector electrodes, said base electrode being connected to the output of said control pulse source,
a variable impedance load connected to said collector electrode,
inductive means connected to said emitter electrode for controlling the base-emitter current rate of increase in response to said pulses, and
feedback means connected to said emitter electrode for shunting current away from said base electrode to hold the potential with respect to ground at said emitter electrode substantially constant.

3. In a current pulse driver,
a transistor having base, emitter and collector electrodes,
variable inductive load means connected to said collector electrode and having a predetermined maximum inductance,
a source of operating potential connected via said inductive means to said collector electrode,
a source of control pulses connected to said base electrode and having a predetermined peak amplitude which is sufficient to bias said transistor into conduction but which is less than the output voltage of said potential source, and
current regulating means connected to said emitter electrode for limiting the maximum rate of change of current in said collector electrode to a level such that the maximum potential difference which can be developed across said inductance is always less than the amount by which the output voltage of said potential source is greater than said peak magnitude of said control pulses.

4. A current pulse driver comprising
a transistor having base, emitter, and collector electrodes,
an electric circuit coupled to said collector electrode,
bistable magnetic switching devices electromagnetically coupled to said circuit, each of said switching devices having a predetermined maximum switching time for switching from one of its stable states to the other, said devices as a group having variable permutations of their stable states whereby they present a correspondingly variable loading on said circuit,
means applying control pulses to said base electrode for biasing said transistor into conduction, and
a time constant circuit connected to said emitter electrode for limiting the rise time of current in said emitter circuit in response to one of said control pulses to an interval having a predetermined relationship to said device switching time.

References Cited by the Examiner

UNITED STATES PATENTS

| | | | |
|---|---|---|---|
| 2,914,683 | 11/1959 | Terry | 307—88.5 |
| 2,999,169 | 9/1961 | Feiner | 307—88.5 |
| 3,076,101 | 1/1963 | Campion | 307—88.5 |
| 3,102,206 | 8/1963 | Morgan | 307—88 |
| 3,112,451 | 11/1963 | Collins | 307—88.5 |

BERNARD KONICK, *Primary Examiner.*

IRVING L. SRAGOW, J. W. MOFFITT, *Assistant Examiners.*